May 10, 1966     E. F. DAWSON     3,250,973
PERMANENT MAGNET FIELD GENERATOR FED MOTOR CONTROL
AS A TORQUE CONVERTER
Filed April 10, 1962
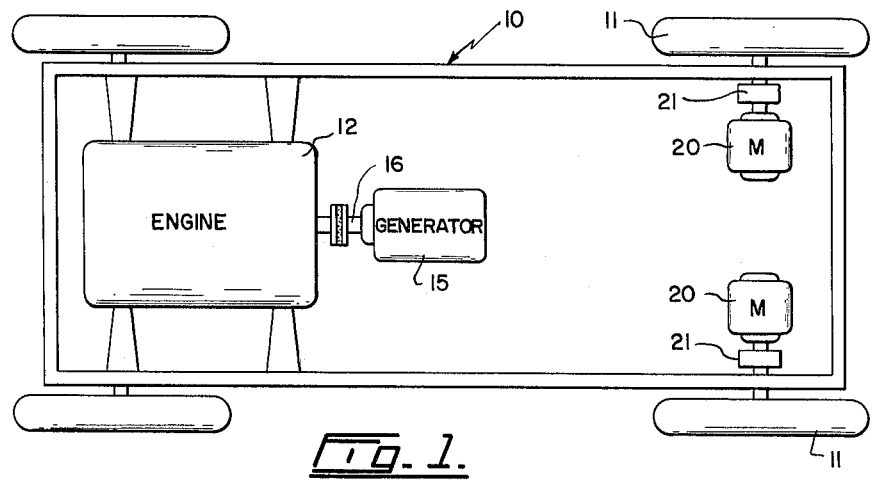
*Fig. 1.*
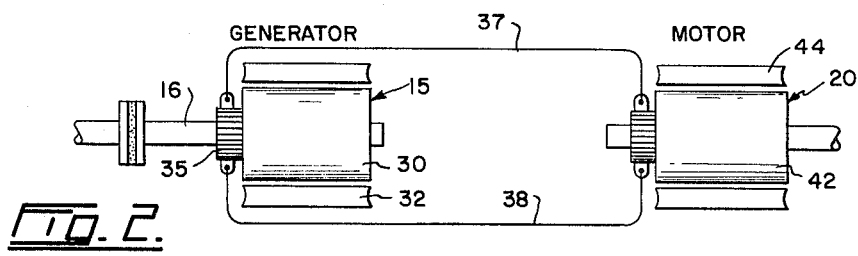
*Fig. 2.*
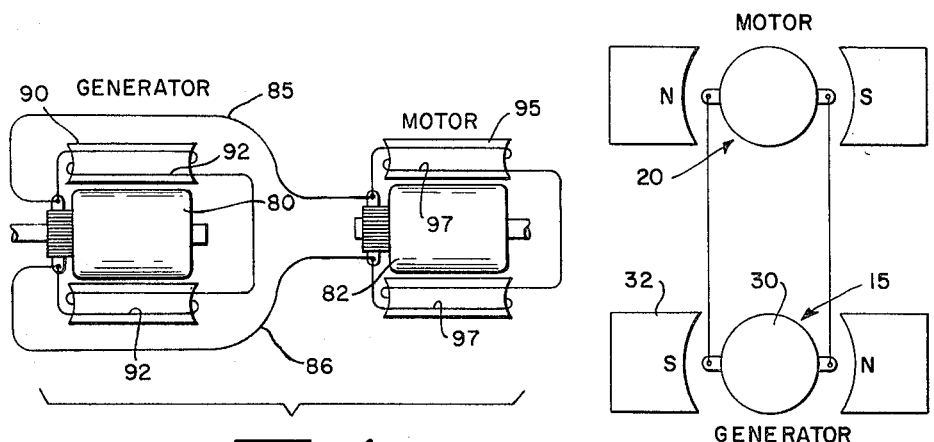
*Fig. 4.*     *Fig. 3.*
INVENTOR
EDWARD F. DAWSON
BY
*Fetherstonhaugh & Co.*
ATTORNEYS

United States Patent Office 3,250,973
Patented May 10, 1966

---

3,250,973
PERMANENT MAGNET FIELD GENERATOR FED MOTOR CONTROL AS A TORQUE CONVERTER
Edward F. Dawson, 3073 Comox Ave., Comox, British Columbia, Canada
Filed Apr. 10, 1962, Ser. No. 186,461
6 Claims. (Cl. 318—147)

This invention relates to an electromagnetic torque converter and particularly to an electromagnetic torque converter adapted for use in the power transmission system of a road vehicle or the like.

The torque converter of the present invention may be utilized in any situation where varying loads at varying speeds are encountered and wherever a variable torque would be desirable, and is thus useful in all types of traction applications which would normally require clutch and gear reduction systems. Although described in connection with a road vehicle, this torque converter may be used in power plants for boats or other purposes.

In its adaptation to the power transmission system of a vehicle, the present invention comprises a D.C. generator adapted to be driven by a prime mover, and at least one motor connected directly or indirectly to the driving wheels of said vehicle and to said generator, said generator having a strong permanently excited field system, and the output of said generator being directly connected in series to said motor, whereby the power supplied to the motor is directly controlled by controlling the speed of the prime mover and consequently the speed of the generator armature.

An object of the present invention is to provide an electric torque converter in which the power delivered to the driven member is automatically controlled by controlling the speed of the driving member.

Another object is to provide an electromagnetic torque converter particularly for use in a vehicle power transmission system with which it is possible to obtain maximum torque at the electric motor at zero vehicle speed while delivering maximum power from the engine and generator.

A further object is to provide an electromagnetic torque converter particularly adapted for use in vehicles which operate over a wide speed range and with a high efficiency.

Another object is to provide an electromagnetic transmission system incorporating torque conversion so that the speed and power of the vehicle is controlled solely and automatically by manipulation of the accelerator of said vehicle.

Yet another object of the invention is to provide an electromagnetic torque converter for use in vehicles, including a D.C. generator adapted to be driven from the vehicle prime mover and connected to one or more electric motors coupled to the drive wheels of the vehicle which eliminates the necessity of the conventional gear transmission and clutch, and in applications where an electric motor is coupled to each of the driving wheels, it is also possible to dispense with the conventional differential.

Other features which may be included in accordance with invention will be described hereinafter and referred to in the appended claims.

The basic idea of this invention is the utilization of an engine-driven D.C. generator having a strong permanent magnet field, the output of said generator being transmitted to one or more electric motors which are directly or indirectly coupled to the unit or units to be driven. This combination of generator and motor form an electric transmission system and is a true torque converter which is controlled entirely by the speed of the driving engine. As the speed of the engine is increased, the amount of torque available is directly increased, and vice versa. A series motor may be used with good results, but it is preferable to use a motor or motors with a permanent magnet field. The use of this type of generator and motor has many advantages, including reduction in cost of manufacture, reduction of heating and electrical winding losses, reduction of weight, and the possibility of improved armature ventilation. Furthermore, the maximum torque is available when it is most needed, that is, when the vehicle is just starting to move, or when accelerating on an adverse grade.

The invention also contemplates the use of a motor with a permanent magnet field, and an opposing shunt winding in said field to automatically decrease the strength of the motor magnetic field as the speed of the motor increases thereby automatically increasing the motor speed range.

In addition to this, an opposing shunt winding may be provided in the permanent magnet field of the generator. The shunt winding can be designed to be effective when the generator output reaches a predetermined voltage. This acts as an output control. This shunt winding may be manually or automatically cut in at certain times in order to lower the output of the generator, such as when the motor demand overloads the generator or exceeds the output of the prime mover at slow speed.

This invention will now be fully described in connection with the accompanying drawings, which show exemplary embodiments of the invention, and in which:

FIGURE 1 is a schematic view of a vehicle having a torque converter incorporated therein, FIGURES 2 and 3 diagrammatically show the mechanical and electrical details of one form of torque converter, and FIGURE 4 is a view similar to FIGURE 2 of an alternative form of torque converter, with opposing shunt windings in both the generator and motor permanent magnet fields, A torque converter according to the present invention is comprised essentially of an electric D.C. generator adapted to be driven by a suitable source of motive power, and one or more electric motors adapted to be energized from said generator, each motor being a power output unit for doing the required work. In this example, the motor or motors is or are connected to the drive wheels of a vehicle either directly or indirectly through a differential or suitable gearing.

Referring to FIGURE 1 of the drawings, 10 represents a road vehicle having driving wheels 11 and a source of motive power, such as a conventional internal combustion engine 12. Instead of the standard transmission system, vehicle 10 includes a torque converter in accordance with the present invention and which comprises a D.C. generator 15 having its armature shaft 16 coupled to the drive shaft of engine 12; and two electric motors 20, each of which is coupled directly or through a suitable reduction gear unit 21 to one of the drive wheels 11. It is obvious that there may be a motor 20 coupled to each of the four wheels of the vehicle, or one motor only may be used, in which case, it would be coupled to both driving wheels 11, preferably through a standard differential. When more than one motor is connected to the generator, the motors may be connected in series or parallel with each other. For the sake of convenience, the torque converter will be described as including generator 15 and one motor 20.

Referring to FIGURES 2 and 3, generator 15 includes a standard armature 30 with shaft 16 projecting from an end thereof. This generator has a high intensity permanent magnet field system 32. This field is maintained by high intensity permanent magnets that have a flux equal to or greater than that of wound electromagnets of similar proportions. Magnets of this type are well known today, and are readily available. The high intensity permanent magnets supply a maximum field strength without any exciting winding or source of power as in a separately excited machine. An advantage of this generator over a wound electromagnet field generator is that you do not require any separate and continuous source of power, such as a battery, or separately driven generator, or both, to energize the electromagnets. Such power would have to be available at all times whether the generator armature is revolving or not.

The output of generator 15 is connected through a commutator 35 and suitable conductors 37 and 38 in series with the armature 42 of motor 20. This motor may be a conventional series wound motor, but it is preferable to use a motor having a high intensity permanent magnet field 44 which also is maintained by suitable high intensity permanent magnets. The D.C. generator and motor used in this form of the invention are of conventional construction, except for the use of high intensity permanent magnet field systems, and as stated above, the motor may be a series wound motor, although this is not considered as satisfactory as the permanent magnet field motor described above.

The speed and power of vehicle 10 may be varied by varying the speed of engine 12 by means of the accelerator thereof in the usual way. Since the generator armature 30 is always in a maximum field, the generator armature output will be at a maximum for any given armature speed. Furthermore, since the resistance of the external circuit, i.e. motor 20, is low, maximum current will also flow in the motor armature 42, and it will develop maximum torque or speed for any particular generator armature speed. No other control of the generator or field is required.

With this torque converter, the amount of power supplied to the motor is dependent directly on the speed of the engine and, consequently, the speed of the generator armature. Thus, at engine idle speed, insufficient current is fed to the motor to move the vehicle. Above idle speed, the current increases, and increases the torque and speed of the motor, thereby moving the vehicle in accordance with the engine speed. In other words, the speed and power of the vehicle is directly dependent upon the engine speed, and is entirely controlled by means of the engine accelerator. The reversing and/or braking of the vehicle may be accomplished by the provision of a reversing switch, not shown. As there is no field winding in the motor, all that is required is to reverse the direction of the current through the motor armature. Thus, the motor is readily operated in either direction of rotation. Furthermore, it is believed that automatic braking is achieved when the wheel drives the motor to which it is connected, such as when the vehicle is coasting down hill. The motor armature at this time is being rotated in a field causing the motor to act as a generator. If the motor voltage output exceeds that of the generator, the direction of current flow would be reversed to cause the generator to act as a motor against the vehicle engine.

FIGURE 4 illustrates an alternative form of torque converter including a high intensity permanent magnet field D.C. generator 80 and a high intensity permanent magnet field motor 82, the output of the generator being connected by suitable conductors 85 and 86 in series with motor 82. The permanent field of generator 80 is maintained by high intensity permanent magnets 90, and each magnet has an opposing shunt winding 92 thereon. Motor 82 also has a high intensity permanent magnet field created by high intensity permanent magnets 95. Each of these magnets has an opposing shunt winding 97 thereon.

Although the torque converter of FIGURE 4 includes opposing shunt windings on the permanent magnets of both the generator and the motor, it will be understood that these shunt windings may be provided only in either the generator or the motor.

The shunt windings 92 constitute an output control in generator 80. These windings can be manually or automatically cut in when required. They act to lower the generator output in the event of the motor demand overloading the generator or exceeding the output of the prime mover at slow speed. It would be desirable to design the generator and motor capable of more horsepower than the engine so that they are not overloaded electrically. For example, a 10 B.H.P. engine may drive a 15 B.H.P. generator and motor. Thus under heavy motor load it would be possible to overload the generator and, in turn, the engine. If at this time the generator shunt were cut in to reduce the generator field, it would allow the engine to increase its speed and horsepower output to carry the load demanded. Furthermore, since the generator armature is revolving in a maximum field for any given speed, the opposing shunt may be used to weaken the field and reduce the output if such reduction is required.

The shunt windings 97 in motor 82 automatically decrease the strength of the motor field as the back E.M.F. builds up. This reduces the resistance to the rotation of the motor armature so that the motor speed range is increased.

What I claim as my invention is:

1. A torque converter comprising, an electric generator, an armature for said generator, a variable speed power source connected to and driving said generator armature, a high intensity permanent field magnet system for said generator maintaining an unvarying field strength regardless of changes of speed in the generator armature, said permanent magnet system comprising the entire field for said generator, at least one electric motor, an armature for said electric motor, conducting means connecting in series the generator armature and the motor armature, said conducting means being free of the generator field magnet system, the armature of the motor adapted to be coupled to a load, the power supplied to the motor being directly controlled by the speed of the power source and the generator armature.

2. A torque converter comprising, an electric generator, an armature for said generator, a variable speed power source connected to and driving said generator armature, a high intensity permanent magnet field system for said generator, a shunt winding on the high intensity permanent magnet field, said shunt winding being provided to reduce the generator field strength when current is passed therethrough, at least one electric motor, an armature for said electric motor, conducting means electrically connecting the generator armature with the motor armature, the armature of the motor adapted to be coupled to a load, the power supplied to the motor being controlled by the speed of the power source and the generator armature.

3. A torque converter according to claim 1 wherein said motor is provided with a high intensity permanent magnet field system comprising the entire field for said motor.

4. A torque converter comprising, an electric generator, an armature for said generator, a variable speed power source connected to and driving said generator armature, a high intensity permanent magnet field system for said generator maintaining an unvarying field strength regardless of changes of speed in the generator armature, at least one electric motor, a high intensity permanent magnet field system for said motor, a shunt winding on the high intensity permanent magnet field of said motor, said shunt winding being provided to reduce the motor field strength when current is passed therethrough, thereby extending the motor speed range, an armature for said electric motor, conducting means electrically connecting the generator armature with the motor armature, the armature of the motor adapted to be coupled to a load, the power supplied to the motor being controlled by the speed of the power source and the generator armature.

5. A torque converter according to claim 2 wherein said electric motor further comprises a high intensity permanent magnet field system.

6. A torque converter according to claim 5 wherein said electric motor further comprises a shunt winding on the high intensity permanent magnet field, said shunt winding being provided to reduce the motor field strength when current is passed therethrough, thereby extending the motor speed range.

References Cited by the Examiner

UNITED STATES PATENTS

| | | | |
|---|---|---|---|
| Re. 23,314 | 12/1950 | Nims | 318—145 |
| 1,730,786 | 10/1929 | Rosenthal | 218—157 X |
| 2,179,547 | 11/1939 | Ernst et al. | 318—157 X |
| 2,500,753 | 3/1950 | Higgs | 318—147 |
| 2,508,151 | 5/1950 | Fisher | 318—154 X |
| 2,761,098 | 8/1956 | Sirotak | 318—151 |

FOREIGN PATENTS 315,045   7/1929   Great Britain.

OTHER REFERENCES

Steinmetz: C. P. Theory and Calculations of Electrical Apparatus, New York, McGraw-Hill, 1917. Tk 2181 .S7, pp. 452–455.

ORIS L. RADER, *Primary Examiner.*